United States Patent
Kim

(10) Patent No.: US 9,182,626 B2
(45) Date of Patent: Nov. 10, 2015

(54) CONVERTING COLOR IN LIQUID CRYSTAL DISPLAY DEVICE HAVING DIFFERENT COLOR FILTER ARRANGEMENTS FOR ODD AND EVEN HORIZONTAL LINES

(71) Applicant: LG Display Co., Ltd., Seoul (KR)

(72) Inventor: Young Hoon Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 222 days.

(21) Appl. No.: 13/673,786

(22) Filed: Nov. 9, 2012

(65) Prior Publication Data
US 2013/0148060 A1    Jun. 13, 2013

(30) Foreign Application Priority Data
Dec. 9, 2011 (KR) .......... 10-2011-0132218

(51) Int. Cl.
*G09G 3/36* (2006.01)
*G02F 1/1335* (2006.01)

(52) U.S. Cl.
CPC ........ *G02F 1/133514* (2013.01); *G09G 3/3648* (2013.01); *G09G 2300/0452* (2013.01); *G09G 2340/06* (2013.01)

(58) Field of Classification Search
CPC ............ G09G 3/3648; G09G 2300/0452; G09G 2340/06
USPC .................... 345/89; 349/106, 109
See application file for complete search history.

(56) References Cited

U.S. PATENT DOCUMENTS

| 8,552,968 B2 | 10/2013 | Chung et al. |
|---|---|---|
| 2005/0083356 A1 | 4/2005 | Roh et al. |
| 2008/0186314 A1 | 8/2008 | Moriya et al. |
| 2010/0328360 A1* | 12/2010 | Miyashita .............. 345/690 |

FOREIGN PATENT DOCUMENTS

| CN | 1652198 A | 8/2005 |
|---|---|---|
| JP | 2003-150126 A | 5/2003 |
| JP | 2008-191317 A | 8/2008 |
| TW | 201015526 A1 | 4/2010 |

OTHER PUBLICATIONS

State Intellectual Property Office of the People's Republic of China, First Office Action, Chinese Patent Application No. 201210523962.6, Jul. 25, 2014, fourteen pages.

(Continued)

*Primary Examiner* — John Kirkpatrick
(74) *Attorney, Agent, or Firm* — Fenwick & West LLP

(57) ABSTRACT

A liquid crystal display device is disclosed. The liquid crystal display device includes: a liquid crystal display panel configured to include color filters arranged to have different color arrangement in odd and even horizontal lines, and to display an image; an input portion configured to input data for pixels opposite to the color filters of the odd and even numbered horizontal lines; a data converter configured to compensate for the input data from the input portion using rendering filter values which are differently set according to the odd and even horizontal lines; a controller configured to re-arrange the compensated data from the data converter into a suitable format for the liquid crystal display panel; and a data driver configured to apply the re-arranged data from the controller to the liquid crystal display panel and drive the liquid crystal display panel.

20 Claims, 5 Drawing Sheets

(56) References Cited

OTHER PUBLICATIONS

Taiwan Intellectual Property Office, Office Action, Taiwanese Patent Application No. 101146232, Oct. 23, 2014, fifteen pages.

* cited by examiner

CONVERTING COLOR IN LIQUID CRYSTAL DISPLAY DEVICE HAVING DIFFERENT COLOR FILTER ARRANGEMENTS FOR ODD AND EVEN HORIZONTAL LINES

CROSS-REFERENCE TO RELATED APPLICATION

The present application claims priority under 35 U.S.C. §119(a) of Korean Patent Application No. 10-2011-0132218 filed on Dec. 9, 2011, which is hereby incorporated by reference in its entirety.

BACKGROUND

1. Field of the Disclosure

The present application relates to a liquid crystal display device and a driving method thereof, and more particularly to a liquid crystal display device and a driving method that are adapted to enhance picture quality.

2. Description of the Related Art

The liquid crystal display device includes a liquid crystal panel which is configured with a thin film transistor substrate provided with a plurality of thin film transistors and a color filter substrate provided with a color filter layer. The liquid crystal panel further includes a liquid crystal layer interposed between the two substrates.

In general, almost all the liquid crystal display devices include the color filter layer, which is formed on the color filter substrate and configured with three primary colored filters such as red, green and blue filter. The liquid crystal display devices control the quantity of light transmitted through the color filter layer and display a desired color.

Recently, a display technology of red, green, blue and white (hereinafter, "RGBW") mode has been developed which further includes white besides red, green and blue, in order to enhance brightness. As such, a method of deriving four color voltages from three color data, rendering methods and so on are applied to the driving of the liquid crystal panel.

The rendering methods individually drive pixels and simultaneously drive pixels adjacent to the pixel to be driven. In other words, the rendering method disperses brightness to the adjacent pixels and displays a single dot.

Among the rendering methods, a sub-pixel rendering method is being used as a technology capable of realize a high definition display using the small number of display pixels. The sub-pixel rendering method enables a gray signal applied to a sub-pixel of a display pixel with an arbitrary color to be overlapped with other sub-pixels adjacent to the display pixel, in order to display an image.

Such a sub-pixel rendering method can reduce the number of sub-pixels within a red, green and blue stripe arrangement to 3/2. In this case, the sub-pixel rendering method can provide the same definition as that of the red, green and blue stripe arrangement according to the related art. As the number of sub-pixels decreases, the area of each sub-pixel can be expanded to 3/2 times. Therefore, the sub-pixel rendering method can allow each sub-pixel to have a high aperture ratio.

The sub-pixel rendering method is also applied to a liquid crystal display device which has a red, green, blue and white stripe arrangement instead of the red, green and blue stripe arrangement. In the liquid crystal display device with the red, green, blue and white stripe arrangement, red, green, blue and white sub-pixels or color filters are arranged in stripe shapes.

The liquid crystal display device with the red, green, blue and white stripe arrangement converts received red, green and blue data into red, green, blue and white data and applies the above-mentioned sub-pixel rendering method to the red, green, blue and white data, in order to display an image. In this case, the sub-pixel rendering method enhances the definition of the liquid crystal display device.

However, the distance between the same color sub-pixels being physically alternated in the red, green, blue and white stripe arrangement is lengthened by ¾ compared to the red, green and blue stripe arrangement of the related art. Also, the same color sub-pixels are arranged adjacently to one another in a vertical direction. As such, not only the definition deteriorates but also a line dim appears on the screen, even though the sub-pixel rendering method is applied to the liquid crystal display device with the red, green, blue and white stripe arrangement. Due to this, picture quality can deteriorate.

SUMMARY

Accordingly, embodiments of the present application are directed to a liquid crystal display device and a driving method thereof that substantially obviate one or more of problems due to the limitations and disadvantages of the related art.

The embodiments are to provide a liquid crystal display device and a driving method thereof that are adapted to enhance picture quality by arranging red, green, blue and white color filters in a zigzagged shape and compensating for red, green and blue data signals in a suitable format for the color filters.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to a first general aspect of the present embodiment, a liquid crystal display device includes: a liquid crystal display panel configured to include color filters, which are arranged to have different color arrangement in odd and even horizontal lines, and to display an image; an input portion configured to input data for pixels opposite to the color filters of the odd and even numbered horizontal lines; a data converter configured to compensate for the input data from the input portion using rendering filter values which are differently set according to the odd and even horizontal lines; a controller configured to re-arrange the compensated data from the data converter into a suitable format for the liquid crystal display panel; and a data driver configured to apply the re-arranged data from the controller to the liquid crystal display panel and drive the liquid crystal display panel, wherein the data converter includes a pseudo data generator configured to divide the input data into the odd and even numbered horizontal lines and generate first and second pseudo data.

A method of driving a liquid crystal display device according to a second general aspect of the present embodiment is applied to a liquid crystal display device which includes a liquid crystal display panel configured to include color filters, which are arranged to have different color arrangement in odd and even horizontal lines, and to display an image, and an input portion configured to input data for pixels opposite to the color filters of the odd and even numbered horizontal lines. The method comprising: compensating for the input data from the input portion using rendering filter values which are differently set according to the odd and even horizontal lines; re-arranging the compensated data into a suitable format for the liquid crystal display panel; and applying the re-arranged data to the liquid crystal display panel to drive the liquid crystal display panel, wherein the data compensation includes dividing the input data into the odd and even numbered horizontal lines and generating first and second pseudo data.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
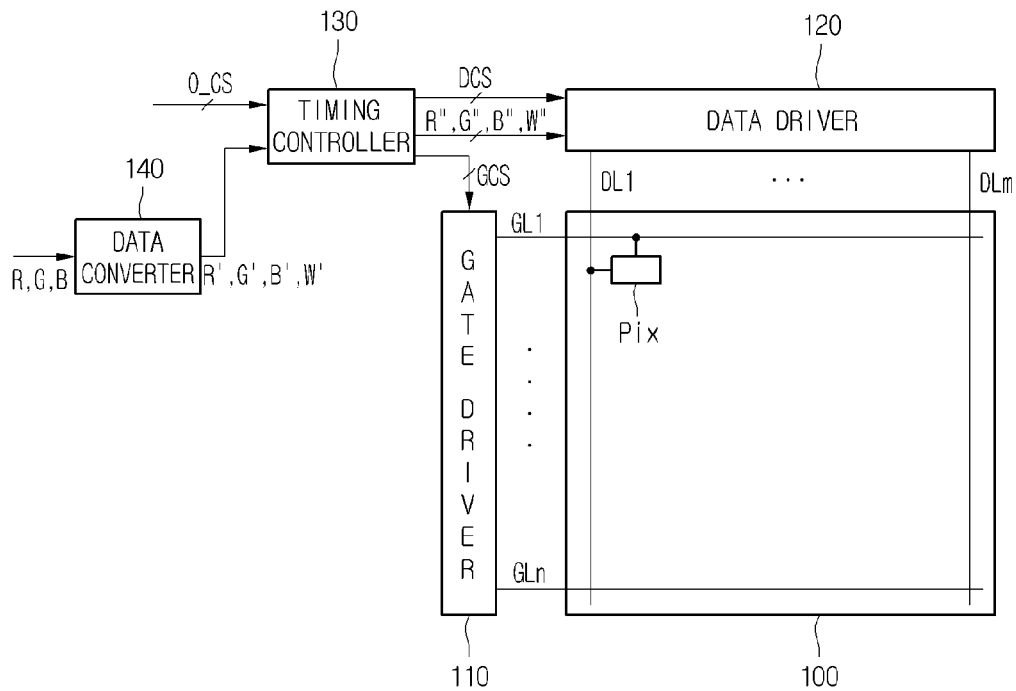
FIG. 1 is a block diagram showing a liquid crystal display device according to an embodiment of the present disclosure.

In the present disclosure, it will be understood that when an element, such as a substrate, a layer, a region, a film, or an electrode, is referred to as being formed "on" or "under" another element in the embodiments, it may be directly on or under the other element, or intervening elements (indirectly) may be present. The term "on" or "under" of an element will be determined based on the drawings.

Reference will now be made in detail to the present embodiments, examples of which are illustrated in the accompanying drawings. In the drawings, the sizes and thicknesses of elements can be exaggerated, omitted or simplified for clarity and convenience of explanation, but they do not mean the practical sizes of elements.

FIG. 1 is a block diagram showing a liquid crystal display device according to an embodiment of the present disclosure.

As shown in FIG. 1, the liquid crystal display device according to an embodiment of the present disclosure includes a liquid crystal display panel 100 configured to display an image, a gate driver 110 configured to drive gate lines GL1~GLn on the liquid crystal display panel 100, a data driver 120 configured to drive data lines DL1~DLm on the liquid crystal display device 100, and a timing controller 130 configured to control the gate driver 110 and the data driver 120. The liquid crystal display device further includes a data converter 140 configured to convert input red, green and blue data into red', green', blue' and white' data.

The liquid crystal display panel 100 includes two glass substrates and a liquid crystal layer interposed between the two substrates. The plurality of gate lines GL1~GLn and the plurality of data lines DL1~DLm are on a lower glass substrate. Also, sub-pixel Pix are formed in regions which are defined by the plurality of gate lines GL1~GLn and the plurality of data lines DL1~DLm crossing each other The sub-pixel Pix includes a thin film transistor TFT connected to the gate line GL and the data line DL, and a pixel electrode connected to the thin film transistor TFT. The thin film transistor TFT responds to a scan signal from one of the gate lines GL1~GLn and transfers a data voltage from one of the data lines DL1~DLm to the respective liquid crystal cell.

To this end, the thin film transistor TFT includes a gate electrode connected to one of the gate lines GL1~GLn, a source electrode connected to one of the data lines DL1~DLm, and a drain electrode connected to the pixel electrode of the respective liquid crystal cell.

Also, the sub-pixel Pix further includes a storage capacitor formed on the lower glass substrate of the liquid crystal display panel 100. The storage capacitor is used to maintain the voltage of the liquid crystal cell for a single frame.

An upper glass substrate of the liquid crystal display panel 100 includes color filters and a black matrix. The color filters are opposite to the pixel regions each having the thin film transistor TFT. The black matrix rims each color filter and screens the gate lines GL1~GLn, the data lines DL1~DLm and the thin film transistors TFT.

The gate driver 110 responds to gate control signals GCS from the timing controller and applied a plurality of scan signals to the plurality of gate lines GL1~GLn. The scan signals are sequentially enabled in a single horizontal signal period. The gate driver 110 can include a plurality of gate integrated-circuit chips.

The data driver 120 responds to data control signals DCS from the timing controller 130 and generates a plurality of data voltages whenever one of the gate lines GL1~GLn is enabled. The plurality of data voltages are applied from the data driver 120 to the data lines DL1~DLm of the liquid crystal display panel 100.

The timing controller 130 receives several control signals O_CS applied from an external system such as a graphic module of a computer system, a demodulation module of a television receiver or others. The timing controller 130 derives the gate control signals GCS and the data control signals DCS from the received control signal O_CS. The gate control signals GCS are used to control the gate driver 110, and the data control signals DCS are used to control the data driver 120.

Also, the timing controller 130 re-arranges red', green', blue' and white' data into a format suitable for the liquid crystal display panel 100, and generates re-arranged red", green", blue" and white" data. The re-arranged red", green", blue" and white" data are applied from the timing controller 130 to the data driver 120.

The data converter 140 receives red, green and blue data from the external system and converts the received red, green and blue data into the red', green', blue', and white data. The converted red', green', blue' and white data are applied from the data converter 140 to the timing controller 130. The data converter 140 will be described in detail referring to FIGS. 4 through 6C, later.

Figure 2:
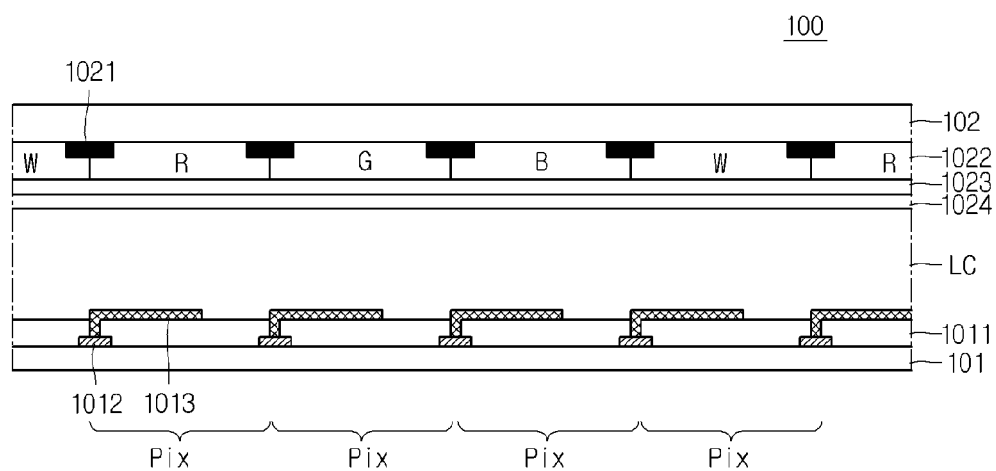
FIG. 2 is a cross-sectional view showing the section of a liquid crystal panel in FIG. 1.

FIG. 2 is a cross-sectional view showing the section of a liquid crystal panel in FIG. 1.

As shown in FIGS. 1 and 2, the liquid crystal display panel 100 includes a first substrate 101, a second substrate 102 disposed to face the first substrate 101, and a liquid crystal layer LC interposed between the first and second substrates 101 and 102.

A pixel electrode 1013 is formed on the first substrate 101 corresponding to each of the plural sub-pixels Pix. The sub-pixels can be combined with one another in order to form a single display pixel. The pixel electrode 1013 can be formed from a transparent conductive material such as indium-tin-oxide (ITO). The pixel electrode 1013 is connected to respective thin film transistor 1012 which is used as a switching element.

The pixel electrode 1013 and the thin film transistor 1012 with a sub-pixel Pix are insulated from those of the other sub-pixels by means of an insulation film 1011.

An alignment film 1014 is formed the entire surface of the first substrate 101 provided with the pixel electrodes 1014. The alignment film 1014 is used to determine an initial alignment of liquid crystal molecules with the liquid crystal layer LC.

Meanwhile, the second substrate 102 is a transparent substrate such as a glass substrate. The second substrate 102 includes a black matrix 1021 which is formed in a lattice shape. Openings formed by the black matrix 1021 are opposite to the pixel electrodes 1013, respectively. Also, the second substrate 102 further includes color filters 1022 formed in the openings. The color filter 1022 determines a color component of each sub-pixel Pix. To this end, the color filters 1022 includes red R, green G, blue B and white W color filters, as shown in the drawings.

A common electrode 1023 is formed on the color filters 1022. The common electrode 1023 is used to apply a common potential to all the sub-pixels Pix. In other words, the potential on the common electrode 1023 is commonly applied to all the sub-pixels Pix.

Another alignment film 1024 is formed on the common electrode 1023 of the second substrate 102. Another alignment film 1024 is used to determine the initial alignment state of liquid crystal molecules with the liquid crystal layer LC, like that of the first substrate 101.

Figure 3:
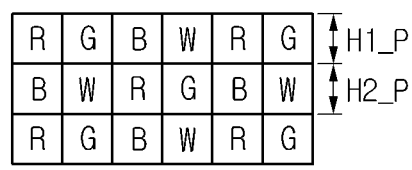
FIG. 3 is a planar view showing color arrangement of the color filters in the FIG. 2.

FIG. 3 is a planar view showing color arrangement of the color filters in the FIG. 2.

As shown in FIGS. 2 and 3, the color filter layer 1022 can be formed to have a mosaic arrangement of red, green, blue and white. For example, the color filter layer 1022 includes red color filters R, green color filters G, blue color filters B and white color filters W which are arranged in a mosaic shape.

The white color filters W, which are included in the color filter layer 1022 together with the red, green and blue color filters R, G and B, can enhance brightness when a white color is displayed.

In the color filter layer 1022, the color filters on an odd-numbered horizontal line H1_P are repeatedly arranged in order of red, green, blue and white, but the color filters on an even-numbered horizontal line H2_P are repeatedly arranged in order of blue, white, red and green.

As such, the red color filters R, the green color filters G, the blue color filters B and the white color filters W on the odd-numbered horizontal lines H1_P are continuously arranged in a column direction. Similarly, the blue color filters B, the white color filters W, the red color filters R and the green color filters G on the even-numbered horizontal lines H1_P are continuously arranged in the column direction.

The color filters 1022 on the even-numbered horizontal lines H2_P are arranged to have different colors from those of the odd-numbered horizontal lines H1_P in a vertical direction. In other words, the color filters on the odd-numbered and even-numbered horizontal lines H1_P and H2_P are arranged in a zigzag color pattern along the vertical direction.

The present embodiment enables a sub-pixel Pix opposite to the red color filter, another sub-pixel Pix opposite to the green color filter, still another sub-pixel Pix opposite to the blue color filter, and further still another sub-pixel Pix opposite to the white color filter to form a single display pixel Pix.

Figure 4:
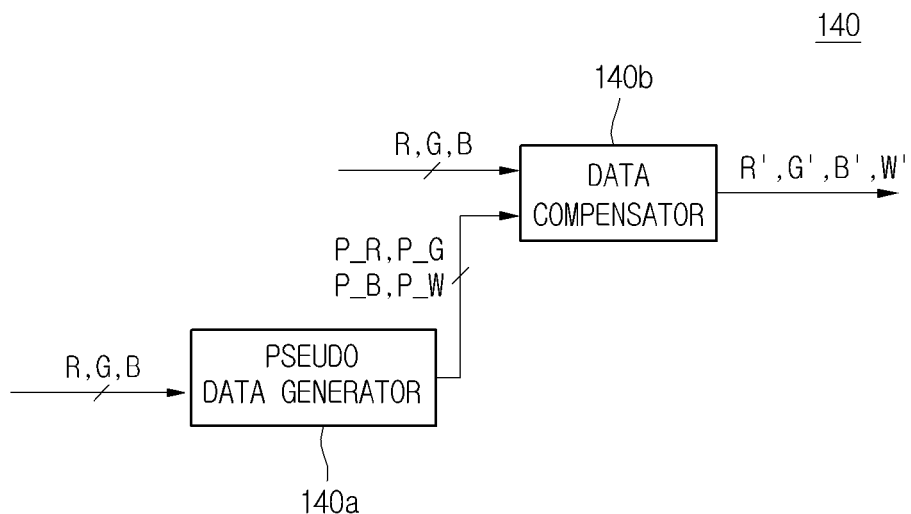
FIG. 4 is a block diagram showing in detail the data converter in FIG. 2.
Figure 5A:
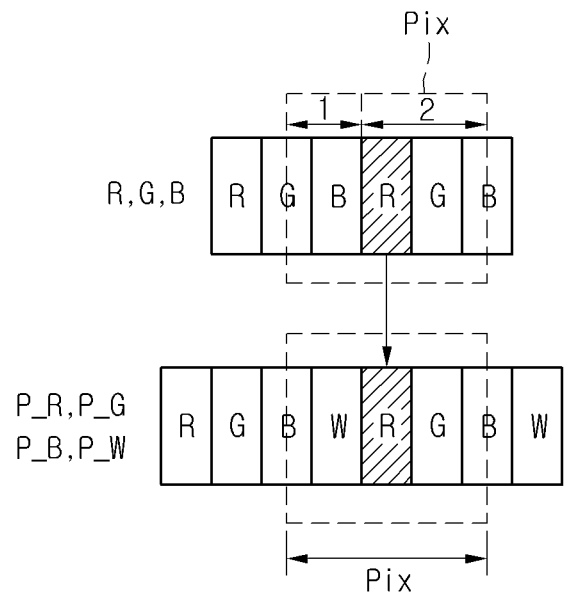
FIGS. 5A through 5C are data sheets illustrating processes of compensating for an odd-numbered horizontal line of input red, green and blue data into red', green' and blue' data through the data converter of FIG. 4.
Figure 5B:
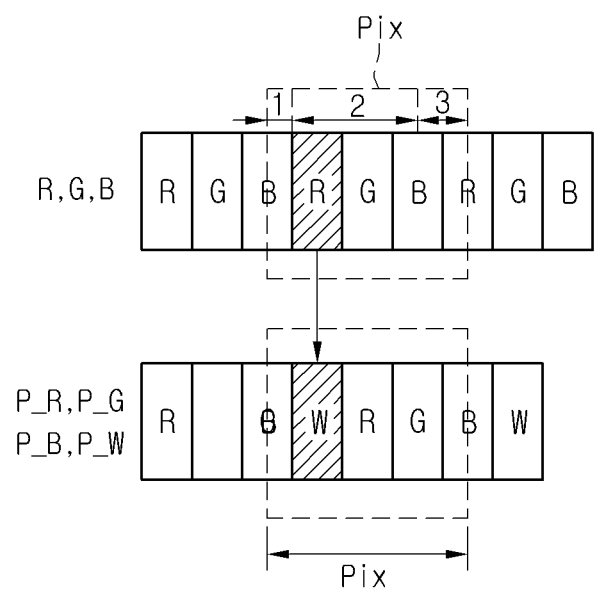
Figure 5C:
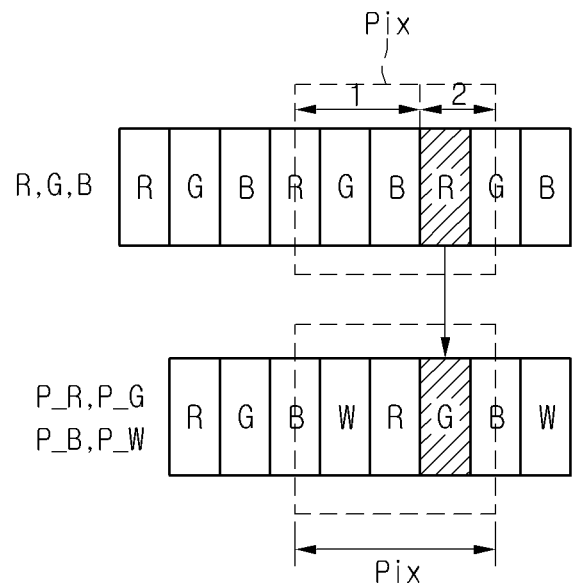
Figure 6A:
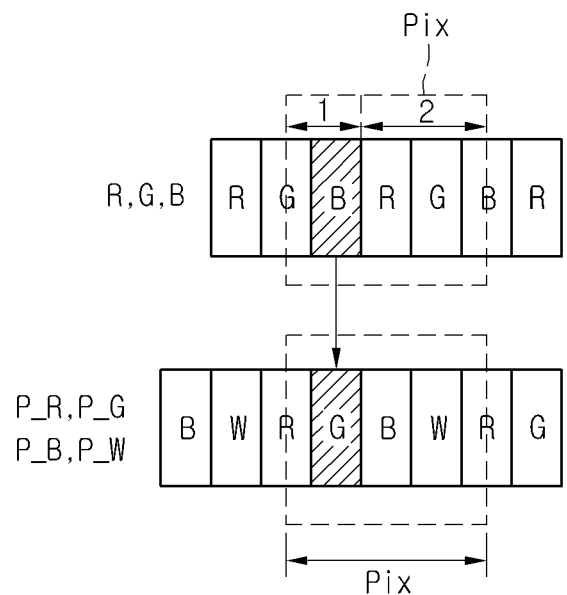
FIGS. 6A through 6C are data sheets illustrating processes of compensating for an even-numbered horizontal line of input red, green and blue data into red', green' and blue' data through the data converter of FIG. 4.
Figure 6B:
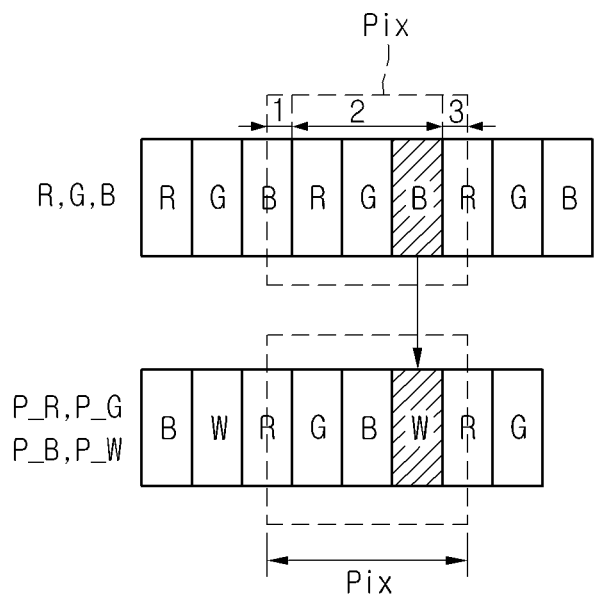
Figure 6C:
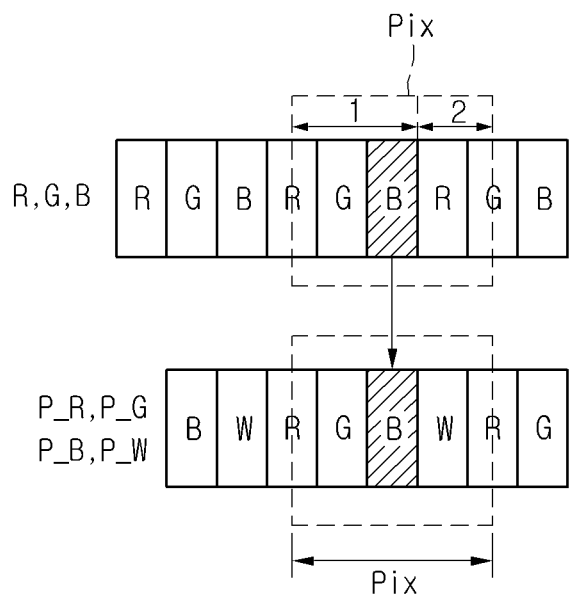

FIG. 4 is a block diagram showing in detail the data converter in FIG. 2. FIGS. 5A through 5C are data sheets illustrating processes of compensating for an odd-numbered horizontal line of input red, green and blue data into red', green' and blue' data by means of the data converter of FIG. 4. FIGS. 6A through 6C are data sheets illustrating processes of compensating for an even-numbered horizontal line of input red, green and blue data into red', green' and blue' data by means of the data converter of FIG. 4.

As shown in FIGS. 1 and 4, the data converter 140 includes a pseudo data generator 140a configured to generate pseudo data P_R, P_G, P_B and P_W using input red, green and blue data from the external system, and a data compensator 140b configured to derive red', green', blue' and white' data from the input red, green and blue data and the red, green, blue and white pseudo data P_R, P_G, P_B and P_W.

The pseudo data generator 140a divides the input red, green and blue data into the odd-numbered and even-numbered horizontal lines, and generates pseudo data P_R, P_G, P_B and P_W according to circumstances.

For example, the pseudo data generator 140a converts the input red, green and blue data of the odd-numbered horizontal line into the pseudo data P_R, P_G, P_B and P_W with the order of red, green, blue and white according to the color order of the color filter arrangement. Also, the pseudo data generator 140a converts the input red, green and blue data of the even-numbered horizontal line into the pseudo data P_R, P_G, P_B and P_W with the order of blue, white, red and green based on the color order of the color filter arrangement. The pseudo data P_R, P_G, P_B and P_W generated in the pseudo data generator 140a are applied to the data compensator 140b.

The data compensator 140b derives the red', green', blue' and white' data from the input red, green and blue data, which are applied from the external system, and the pseudo data P_R, P_G, P_B and P_W using rendering filter values which are differently set according to the odd and even numbered horizontal lines.

More specifically, the data compensator 140b applies one of first through third rendering filter values, which are differently set from one another, to the input red, green and blue data and the pseudo data P_R, P_G, P_B and P_W of the odd-numbered horizontal line, based on the arranged positions of the input red, green and blue data.

If the input red, green and blue data and the pseudo data P_R, P_G, P_B and P_W included in an odd-numbered horizontal line have the input red data at the same position as the red pseudo data as shown in FIG. 5A (hereinafter, "first case"), the data compensator applies the first rendering filter value to the data compensation.

In order to perform the data compensation, the data compensator 140b groups the input red data among the input red, green and blue data, which is at the same position as the red pseudo data, and the input blue and green data adjacent to the input red data, into a single display pixel Pix.

Subsequently, the data compensator 140*b* defines the display pixel Pix into first and second blocks 1 and 2. Also, the data compensator 140*b* generates the red' data, in which the input red data is compensated, by applying the first rendering filter value to red data components included in the first and second blocks 1 and 2.

The red' data, to which the first rendering filter value is applied, can be obtained from the following equation 1.

$$R' = [R11 \quad R12 \quad R13] * \begin{bmatrix} 3/8 \\ 5/8 \\ 0 \end{bmatrix} \quad \text{[Equation 1]}$$

where, "R11" is the red data component within the first block 1, "R12" is the red data component within the second block 2, and "R13" is a red data component within a third block.

Although the single display pixel Pix configured with the input red data and the input blue and green data adjacent thereto is divided into the first and second blocks 1 and 2 in the first case of FIG. 5A, the data compensator 140*b* can define the single display pixel Pix into first through third blocks. In view of this point, "R13" is included in the equation 1.

The red' data, to which the first rendering filter value is applied, corresponds to the sum of a multiplied value of the red data component of the first block 1 and "3/8" and another multiplied value of the red data component of the second block 2 and "5/8".

If the input red, green and blue data and the pseudo data P_R, P_G, P_B and P_W included in an odd-numbered horizontal line have the input red data at the same position as the white pseudo data as shown in FIG. 5B (hereinafter, "second case"), the data compensator applies the second rendering filter value to the data compensation.

In the data compensation, the data compensator 140*b* groups the input red data among the input red, green and blue data, which is at the same position as the white pseudo data, and the input green and blue continuously arranged from the input red data, into a single display pixel Pix.

Thereafter, the data compensator 140*b* defines the display pixel Pix into first through third blocks 1 through 3. Also, the data compensator 140*b* generates the red' data, in which the input red data is compensated, by applying the second rendering filter value to red data components included in the first through third blocks 1 through 3.

The red' data, to which the second rendering filter value is applied, can be obtained from the following equation 2.

$$R' = [R11 \quad R12 \quad R13] * \begin{bmatrix} 1/8 \\ 6/8 \\ 1/8 \end{bmatrix} \quad \text{[Equation 2]}$$

where "R11" is the red data component within the first block 1, "R12" is the red data component within the second block 2, and "R13" is the red data component within the third block 3.

The red' data, to which the second rendering filter value is applied, corresponds to the sum of a multiplied value of the red data component of the first block 1 and "1/8", another multiplied value of the red data component of the second block 2 and "6/8" and still another multiplied value of the red data component of the third block 3.

If the input red, green and blue data and the pseudo data P_R, P_G, P_B and P_W included in an odd-numbered horizontal line have the input red data at the same position as the green pseudo data as shown in FIG. 5C (hereinafter, "third case"), the data compensator applies the third rendering filter value to the data compensation.

In the data compensation, the data compensator 140*b* groups the input red data of the input red, green and blue data at the same position as the green pseudo data, and the input blue and green data are sequentially arranged before the input red data into a single display pixel Pix.

Subsequently, the data compensator 140*b* defines the display pixel Pix into first and second blocks 1 and 2. Also, the data compensator 140*b* generates the red' data, in which the input red data is compensated, by applying the third rendering filter value to red data components included in the first and second blocks 1 and 2.

The red' data, to which the third rendering filter value is applied, can be obtained from the following equation 3.

$$R' = [R11 \quad R12 \quad R13] * \begin{bmatrix} 0 \\ 5/8 \\ 3/8 \end{bmatrix} \quad \text{[Equation 3]}$$

where "R12" is the red data component within the first block 1, "R13" is the red data component within the second block 2, and "R11" is a red data component within a third block.

The single display pixel Pix, which is configured with the input red data and the input blue and green data sequentially arranged before the input red data, is divided into the first and second blocks 1 and 2, in the third case of FIG. 5C. However, the data compensator 140*b* can define the single display pixel Pix into first through third blocks. Due to this, "R11" is included in the above-mentioned equation 3.

The red' data, to which the third rendering filter value is applied, corresponds to the sum of a multiplied value of the red data component of the first block 1 and "5/8" and another multiplied value of the red data component of the second block 2 and "3/8".

The data compensator 140*b* calculates the red' data using one of the first through third rendering filter values according to the cases which are determined by the position of the input red data for the pseudo data. Also, the data compensator 140*b* can calculate the green' and blue' data, to which one of the first through third rendering filter values is applied, for the input green and blue data in the same compensation method as the input red data.

In this manner, the data compensator 140*b* calculates the compensated red', green' and blue' data of the odd-numbered horizontal line using the input red, green and blue data and the pseudo data P_R, P_G, P_B and P_W of the odd-numbered horizontal line.

Moreover, the data compensator 140*b* uses the white pseudo data generated in the pseudo data generator 140*a* as a compensated white' data. As such, the data compensator 140*b* applies the compensated red', green' and blue' data as well as the compensated white' data to the timing controller (130 in FIG. 1).

The data compensator 140*b* calculates the red', green', blue' and white' data of the even-numbered horizontal line using the input red, green and blue data and the pseudo data P_R, P_G, P_B and P_W of the even-numbered horizontal line.

Similarly to the data compensation for the odd-numbered horizontal line, the data compensator 140*b* applies one of fourth through sixth rendering filter values, which are differently set from one another, to the input red, green and blue data and the pseudo data P_R, P_G, P_B and P_W of the even-numbered horizontal line, based on the arranged positions of the input red, green and blue data.

If the input red, green and blue data and the pseudo data P_R, P_G, P_B and P_W included in an even-numbered horizontal line have the input blue data at the same position as the green pseudo data as shown in FIG. 6A (hereinafter, "fourth case"), the data compensator applies the fourth rendering filter value to the data compensation.

In the data compensation, the data compensator 140b groups the input blue data among the input red, green and blue data, which is at the same position as the green pseudo data, and the input red and green data continuously arranged from the input blue data, into a single display pixel Pix.

Subsequently, the data compensator 140b defines the display pixel Pix into first and second blocks 1 and 2. Also, the data compensator 140b generates the blue' data, in which the input blue data is compensated, by applying the fourth rendering filter value to blue data components included in the first and second blocks 1 and 2.

The blue' data, to which the fourth rendering filter value is applied, can be obtained from the following equation 4.

$$B' = [\,B11 \quad B12 \quad B13\,] * \begin{bmatrix} 3/8 \\ 5/8 \\ 0 \end{bmatrix} \quad \text{[Equation 4]}$$

where "B11" is the blue data component within the first block 1, "B12" is the blue data component within the second block 2, and "B13" is a blue data component within a third block.

Although the single display pixel Pix configured with the input blue data and the input red and green data continuously arranged therefrom is divided into the first and second blocks 1 and 2 in the fourth case of FIG. 6A, the data compensator 140b can define the single display pixel Pix into first through third blocks. In view of this point, "B13" is included in the above-mentioned equation 4.

The blue' data, to which the fourth rendering filter value is applied, corresponds to the sum of a multiplied value of the blue data component of the first block 1 and "3/8" and another multiplied value of the blue data component of the second block 2 and "5/8".

If the input red, green and blue data and the pseudo data P_R, P_G, P_B and P_W included in an even-numbered horizontal line have the input blue data at the same position as the white pseudo data as shown in FIG. 6B (hereinafter, "fifth case"), the data compensator 140b applies the fifth rendering filter value to the data compensation.

In the data compensation, the data compensator 140b groups the input blue data among the input red, green and blue data, which is at the same position as the white pseudo data, and the input green and red data sequentially arranged before the input blue data, into a single display pixel Pix.

Thereafter, the data compensator 140b defines the display pixel Pix into first through third blocks 1 through 3. Also, the data compensator 140b generates the blue' data, in which the input blue data is compensated, by applying the fifth rendering filter value to blue data components included in the first through third blocks 1 through 3.

The blue' data, to which the fifth rendering filter value is applied, can be obtained from the following equation 5.

$$B' = [\,B11 \quad B12 \quad B13\,] * \begin{bmatrix} 1/8 \\ 6/8 \\ 1/8 \end{bmatrix} \quad \text{[Equation 5]}$$

where "B11" is the blue data component within the first block 1, "B12" is the blue data component within the second block 2, and "B13" is a blue data component within a third block.

The blue' data, to which the fifth rendering filter value is applied, corresponds to the sum of a multiplied value of the blue data component of the first block 1 and "1/8", another multiplied value of the blue data component of the second block 2 and "6/8" and still another multiplied value of the blue data component of the third block 3 and "1/8".

If the input red, green and blue data and the pseudo data P_R, P_G, P_B and P_W included in an even-numbered horizontal line have the input blue data at the same position as the blue pseudo data as shown in FIG. 6C (hereinafter, "sixth case"), the data compensator applies the sixth rendering filter value to the data compensation.

In the data compensation, the data compensator 140b groups the input blue data among the input red, green and blue data, which is at the same position as the blue pseudo data, and the input red and green data adjacent to the input blue data, into a single display pixel Pix.

Afterward, the data compensator 140b defines the display pixel Pix into first and second blocks 1 and 2. Also, the data compensator 140b generates the blue' data, in which the input blue data is compensated, by applying the sixth rendering filter value to blue data components included in the first and second blocks 1 and 2.

The blue' data, to which the sixth rendering filter value is applied, can be obtained from the following equation 6.

$$B' = [\,B11 \quad B12 \quad B13\,] * \begin{bmatrix} 0 \\ 5/8 \\ 3/8 \end{bmatrix} \quad \text{[Equation 6]}$$

where "B12" is the blue data component within the first block 1, "B13" is the blue data component within the second block 2, and "B11" is a blue data component within a third block.

In the sixth case of FIG. 6C, the single display pixel Pix configured with the input blue data and the input red and green data adjacent thereto is divided into the first and second blocks 1 and 2. However, the data compensator 140b can define the single display pixel Pix into first through third blocks. Due to this, "B11" is included in the above-mentioned equation 6.

The blue' data, to which the sixth rendering filter value is applied, corresponds to the sum of a multiplied value of the blue data component of the first block 1 and "5/8" and another multiplied value of the blue data component of the second block 2 and "3/8".

The data compensator 140b calculates the blue' data using one of the fourth through sixth rendering filter values according to the cases which are determined by the position of the input blue data for the pseudo data. Also, the data compensator 140b can calculate the green' and red' data, to which one of the fourth through sixth rendering filter values is applied, for the input green and red data in the same compensation method as the input blue data.

In this way, the data compensator 140b calculates the compensated red', green' and blue' data of the even-numbered horizontal line using the input red, green and blue data and the pseudo data P_R, P_G, P_B and P_W of the even-numbered horizontal line.

Furthermore, the data compensator 140*b* uses the white pseudo data generated in the pseudo data generator 140*a* as a compensated white' data. As such, the data compensator 140*b* applies the compensated red', green' and blue' data as well as the compensated white' data to the timing controller (130 in FIG. 1).

The timing controller (130 in FIG. 1) re-arranges the red', green', blue' and white' data applied from the data compensator 140*b* into a suitable format for the liquid crystal display panel (100 in FIG. 1), and generates the re-arranged red", green", blue" and white" data. The re-arranged red", green", blue" and white" data are applied from the timing controller (130 in FIG. 1) to the data driver (120 in FIG. 1).

As described above, the liquid crystal display device of the present embodiment uses different rendering filter values for data which are applied to pixels opposite to the color filters of the odd and even numbered horizontal lines. As such, the liquid crystal display device can obtain the differently compensated red', green', blue' and white' data according to the odd and even numbered horizontal lines.

The red', green', blue' and white' data, which are differently compensated according to the odd and even numbered horizontal lines, are applied to the respective pixel. As such, the pixels on the odd-numbered horizontal line can be arranged to have different colors from those on the even-numbered horizontal line in a vertical direction. In other words, the same color pixels are arranged in a zigzag pattern along a vertical direction.

In accordance therewith, the liquid crystal display device of the present embodiment can reduce the distance between the color filters with the same color in the horizontal direction, unlike that of the related art allowing the color filters with the same color to be arranged in a vertical direction. Therefore, the line dim can be prevented, and furthermore picture quality can be enhanced.

It should be understood that numerous other modifications and embodiments can be devised by those skilled in the art that will fall within the spirit and scope of the principles of this disclosure. In other words, although embodiments have been described with reference to a number of illustrative embodiments thereof, this disclosure is not limited to those. Accordingly, the scope of the present disclosure shall be determined only by the appended claims and their equivalents. In addition, variations and modifications in the component parts and/or arrangements, alternative uses must be regarded as included in the appended claims.

What is claimed is:

1. A liquid crystal display device comprising:
   a liquid crystal display panel configured to include color filters arranged to have different color arrangement in odd and even horizontal lines, and configured to display an image;
   an input portion configured to input data for pixels opposite to the color filters of the odd and even numbered horizontal lines;
   a data converter configured to compensate for the input data, the input data indicating each of input pixels of the image, the input pixels having a first number of color components, to generate compensated data indicating each of output pixels of the image, the output pixels having a second number of color components larger than the first number of color components, the data converter comprising a pseudo data generator configured to generate pseudo data pixels having the second number of color components, the pseudo data pixels including first pseudo data pixels for the odd-horizontal lines having a first sequence of color arrangement and second pseudo data pixels for the even-horizontal lines having a second sequence of color arrangement different from the first sequence, the input data compensated by (i) identifying, for each of the first and second pseudo data pixels, a corresponding input pixel of the input data, (ii) dividing the corresponding input pixel into a plurality of blocks, and (iii) obtaining a value for a color component in each of the indicated output pixels by adding values of the color component in each of the plurality of blocks multiplied by element values of a filter that vary depending at least on (a) whether each input pixel is in an odd horizontal line or an even horizontal line and (b) a position of the color component in the input pixel corresponding to a position of a color data component in the corresponding pixel of the first and second pseudo data;
   a controller configured to re-arrange the compensated data from the data converter into a suitable format for the liquid crystal display panel; and
   a data driver configured to apply the re-arranged data from the controller to the liquid crystal display panel and drive the liquid crystal display panel.

2. The liquid crystal display device of claim 1, wherein three different filters are used for the odd-numbered horizontal line.

3. The liquid crystal display device of claim 1, wherein three different filters are used for the even-numbered horizontal line.

4. The liquid crystal display device of claim 1, wherein the color filters of the odd and even numbered horizontal lines are arranged in a zigzag-colored pattern.

5. The liquid crystal display device of claim 1, wherein a value for a red data component in the pixel of an odd-numbered horizontal line is obtained by:

$$R' = [\, R11 \quad R12 \quad R13 \,] * \begin{pmatrix} 3/8 \\ 5/8 \\ 0 \end{pmatrix}$$

when the red data component of the pixel of the input data is at a same position as a red data component of the first pseudo data, where R' represents the value for the red data component in the pixel of the odd-numbered horizontal line, R11 is a red data component within a first block of the corresponding input pixel, R12 is a red data component within a second block of the corresponding input pixel and R13 is a red data component within a third block of the corresponding input pixel.

6. The liquid crystal display device of claim 1, wherein a value for a red data component in the pixel of an odd-numbered horizontal line is obtained by:

$$R' = [\, R11 \quad R12 \quad R13 \,] * \begin{pmatrix} 1/8 \\ 6/8 \\ 1/8 \end{pmatrix}$$

when the red data component of the pixel of the input data is at a same position as a white data component of the first pseudo data, where R' represents the value for the red data component in the pixel of the odd-numbered horizontal line, R11 is a red data component within a first block of the corresponding input pixel, R12 is a red data component within a second block of the corresponding input pixel and R13 is a red data component within a third block of the corresponding input pixel.

7. The liquid crystal display device of claim 1, wherein a value for a red data component in the pixel of an odd-numbered horizontal line is obtained by:

$$R' = [R11 \quad R12 \quad R13] * \begin{pmatrix} 0 \\ 5/8 \\ 3/8 \end{pmatrix}$$

when the red data component of a pixel of the input data is at a same position as a green data component of the first pseudo data, where R' represents the value for the red data component in the pixel of the odd-numbered horizontal line, R11 is a red data component within a first block of the corresponding input pixel, R12 is a red data component within a second block of the corresponding input pixel and R13 is a red data component within a third block of the corresponding input pixel.

8. The liquid crystal display device of claim 1, wherein a value for a blue data component in the pixel of an even-numbered horizontal line is obtained by:

$$B' = [B11 \quad B12 \quad B13] * \begin{pmatrix} 3/8 \\ 5/8 \\ 0 \end{pmatrix}$$

when the blue data component of the pixel of the input data is at a same position as a green data component of the second pseudo data, where R' represents the value for the blue color in the pixel of the odd-numbered horizontal line, R11 is a blue data component within a first block of the corresponding input pixel, R12 is a blue data component within a second block of the corresponding input pixel and R13 is a blue data component within a third block of the corresponding input pixel.

9. The liquid crystal display device of claim 1, wherein a value for a blue data component in the pixel of an even-numbered horizontal line is obtained by:

$$B' = [B11 \quad B12 \quad B13] * \begin{pmatrix} 1/8 \\ 6/8 \\ 1/8 \end{pmatrix}$$

when the blue data component of the pixel of the input data is at a same position as a white data component of the second pseudo data, where R' represents the value for the blue color in the pixel of the odd-numbered horizontal line, R11 is a blue data component within a first block of the corresponding input pixel, R12 is a blue data component within a second block of the corresponding input pixel and R13 is a blue data component within a third block of the corresponding input pixel.

10. The liquid crystal display device of claim 1, wherein a value for a blue data component in the pixel of an even-numbered horizontal line is obtained by:

$$B' = [B11 \quad B12 \quad B13] * \begin{pmatrix} 0 \\ 5/8 \\ 3/8 \end{pmatrix}$$

when the blue data component of the pixel of the input data is at a same position as a blue data component of the second pseudo data, where R' represents the value for the blue color in the pixel of the odd-numbered horizontal line, R11 is a blue data component within a first block of the corresponding input pixel, R12 is a blue data component within a second block of the corresponding input pixel and R13 is a blue data component within a third block of the corresponding input pixel.

11. A method of driving a liquid crystal display device, comprising:

compensating for input data from input portion, the input data indicating each of input pixels of an image, the input pixels having a first number of color components, thereby generating compensated data indicating each of output pixels of the image, the output pixels having a second number of color components larger than the first number of color components, by:

generating first pseudo data pixels having the second number of color components for the odd-horizontal lines of an input data having a first sequence of color arrangement, generating second pseudo data pixels having the second number of color components for the even-horizontal lines of the input data having a second sequence of color arrangement different from the first sequence, identifying, for each pixel of the first and second pseudo data, a corresponding pixel of the input data, dividing the corresponding input pixel into a plurality of blocks, and obtaining a value for a color component in each of the indicated output pixels by adding values of the color component in each of the plurality of blocks multiplied by element values of a filter that vary depending at least on (a) whether each input pixel is in an odd horizontal line or an even horizontal line and (b) a position of the color component in the input pixel corresponding to a position of a color data component in the corresponding pixel of the first and second pseudo data;

re-arranging the compensated data into a suitable format for the liquid crystal display panel; and applying the re-arranged data to the liquid crystal display panel to drive the liquid crystal display panel.

12. The method of claim 11, wherein three different filters are used for the odd-numbered horizontal line.

13. The method of claim 11, wherein three different filters are used for the even-numbered horizontal line.

14. The method of claim 11, wherein the color filters of the odd and even numbered horizontal lines are arranged in a zigzag-colored pattern.

15. The method of claim 11, wherein a value for a red data component in the pixel of an odd-numbered horizontal line is obtained by:

$$R' = [\begin{matrix} R11 & R12 & R13 \end{matrix}] * \begin{pmatrix} 3/8 \\ 5/8 \\ 0 \end{pmatrix}$$

when the red data component of the pixel of the input data is at a same position as a red data component of the first pseudo data, where R' represents the value for the red data component in the pixel of the odd-numbered horizontal line, R11 is a red data component within a first block of the corresponding input pixel, R12 is a red data component within a second block of the corresponding input pixel and R13 is a red data component within a third block of the corresponding input pixel.

16. The method of claim 11, wherein a value for a red data component in the pixel of an odd-numbered horizontal line is obtained by:

$$R' = [\begin{matrix} R11 & R12 & R13 \end{matrix}] * \begin{pmatrix} 1/8 \\ 6/8 \\ 1/8 \end{pmatrix}$$

when the red data component of the pixel of the input data is at a same position as a white data component of the first pseudo data, where R' represents the value for the red data component in the pixel of the odd-numbered horizontal line, R11 is a red data component within a first block of the corresponding input pixel, R12 is a red data component within a second block of the corresponding input pixel and R13 is a red data component within a third block of the corresponding input pixel.

17. The method of claim 11, wherein a value for a red data component in the pixel of an odd-numbered horizontal line is obtained by:

$$R' = [\begin{matrix} R11 & R12 & R13 \end{matrix}] * \begin{pmatrix} 0 \\ 5/8 \\ 3/8 \end{pmatrix}$$

when the red data component of a pixel of the input data is at a same position as a green data component of the first pseudo data, where R' represents the value for the red data component in the pixel of the odd-numbered horizontal line, R11 is a red data component within a first block of the corresponding input pixel, R12 is a red data component within a second block of the corresponding input pixel and R13 is a red data component within a third block of the corresponding input pixel.

18. The method of claim 11, wherein a value for a blue data component in the pixel of an even-numbered horizontal line is obtained by:

$$B' = [\begin{matrix} B11 & B12 & B13 \end{matrix}] * \begin{pmatrix} 3/8 \\ 5/8 \\ 0 \end{pmatrix}$$

when the blue data component of the pixel of the input data is at a same position as a green data component of the second pseudo data, where R' represents the value for the blue color in the pixel of the odd-numbered horizontal line, R11 is a blue data component within a first block of the corresponding input pixel, R12 is a blue data component within a second block of the corresponding input pixel and R13 is a blue data component within a third block of the corresponding input pixel.

19. The method of claim 11, wherein a value for a blue data component in the pixel of an even-numbered horizontal line is obtained by:

$$B' = [\begin{matrix} B11 & B12 & B13 \end{matrix}] * \begin{pmatrix} 1/8 \\ 6/8 \\ 1/8 \end{pmatrix}$$

when the blue data component of the pixel of the input data is at a same position as a white data component of the second pseudo data, where R' represents the value for the blue color in the pixel of the odd-numbered horizontal line, R11 is a blue data component within a first block of the corresponding input pixel, R12 is a blue data component within a second block of the corresponding input pixel and R13 is a blue data component within a third block of the corresponding input pixel.

20. The method of claim 11, wherein a value for a blue data component in the pixel of an even-numbered horizontal line is obtained by:

$$B' = [\begin{matrix} B11 & B12 & B13 \end{matrix}] * \begin{pmatrix} 0 \\ 5/8 \\ 3/8 \end{pmatrix}$$

when the blue data component of the pixel of the input data is at a same position as a blue data component of the second pseudo data, where R' represents the value for the blue color in the pixel of the odd-numbered horizontal line, R11 is a blue data component within a first block of the corresponding input pixel, R12 is a blue data component within a second block of the corresponding input pixel and R13 is a blue data component within a third block of the corresponding input pixel.

* * * * *